United States Patent [19]
Okino

[11] Patent Number: 5,754,705
[45] Date of Patent: May 19, 1998

[54] IMAGE DATA COMPRESSING APPARATUS HAVING A SENSOR SIZE MATCHING COMPRESSION PROCESSING BLOCK SIZE

[75] Inventor: Tadashi Okino, Yokohama, Japan

[73] Assignee: Canon Kabushiki Kaisha, Tokyo, Japan

[21] Appl. No.: 180,774

[22] Filed: Jan. 10, 1994

Related U.S. Application Data

[63] Continuation of Ser. No. 4,671, Jan. 14, 1993, abandoned, which is a continuation of Ser. No. 785,287, Oct. 30, 1991, abandoned.

[30] Foreign Application Priority Data

Nov. 2, 1990 [JP] Japan .................................. 2-295198
Nov. 2, 1990 [JP] Japan .................................. 2-295200

[51] Int. Cl.⁶ ........................................... G06T 9/00
[52] U.S. Cl. ..................... 382/250; 382/324; 358/433
[58] Field of Search ................ 382/56, 65, 68, 382/66, 67, 248, 322, 323, 324, 250; 358/261.3, 432, 433, 471, 474, 482, 483, 494; 348/322, 324

[56] References Cited

U.S. PATENT DOCUMENTS

| | | | |
|---|---|---|---|
| 3,694,806 | 9/1972 | Freeman | 382/65 |
| 4,293,920 | 10/1981 | Merola | 382/250 |
| 4,330,796 | 5/1982 | Anagnostopoulos | 348/322 |
| 4,642,698 | 2/1987 | Yamada | 358/261.3 |
| 4,698,689 | 10/1987 | Tzou | 358/433 |
| 4,707,859 | 11/1987 | Nudd et al. | 382/68 |
| 4,737,854 | 4/1988 | Tandon et al. | 358/213.27 |
| 4,792,982 | 12/1988 | Devos et al. | 382/68 |
| 4,811,409 | 3/1989 | Caran | 382/65 |
| 4,942,473 | 7/1990 | Feevi et al. | 348/306 |
| 4,970,403 | 11/1990 | Krasutsky | 250/216 |
| 5,051,840 | 9/1991 | Watanabe et al. | 358/433 |
| 5,058,190 | 10/1991 | Levitt et al. | 382/68 |
| 5,113,260 | 5/1992 | Tandon | 358/474 |
| 5,113,365 | 5/1992 | Yang | 364/807 |
| 5,168,528 | 12/1992 | Field, Jr. | 382/68 |

OTHER PUBLICATIONS

Fossum, "Architectures for Focal Plane Image Processing." Optical Engineering, vol. 28, No. 8, Aug. 1989, pp. 865–871.

Kemeny et al. "CCD Image Sensor with Differential, Pyramidal Output for Lossless Image Compression." Proc. IEEE 1991 Custom Integr. Circuits Conference, May 1991, pp. 12.6/1–4.

*Primary Examiner*—Michael T. Razavi
*Assistant Examiner*—Jon Chang
*Attorney, Agent, or Firm*—Fitzpatrick, Cella, Harper & Scinto

[57] ABSTRACT

An image sensor has a light receiving section having a number of outputs along one dimension that is the same as the number of inputs along a dimension of a block serving as a unit for image processing, thereby eliminating the need for a buffer memory.

8 Claims, 15 Drawing Sheets

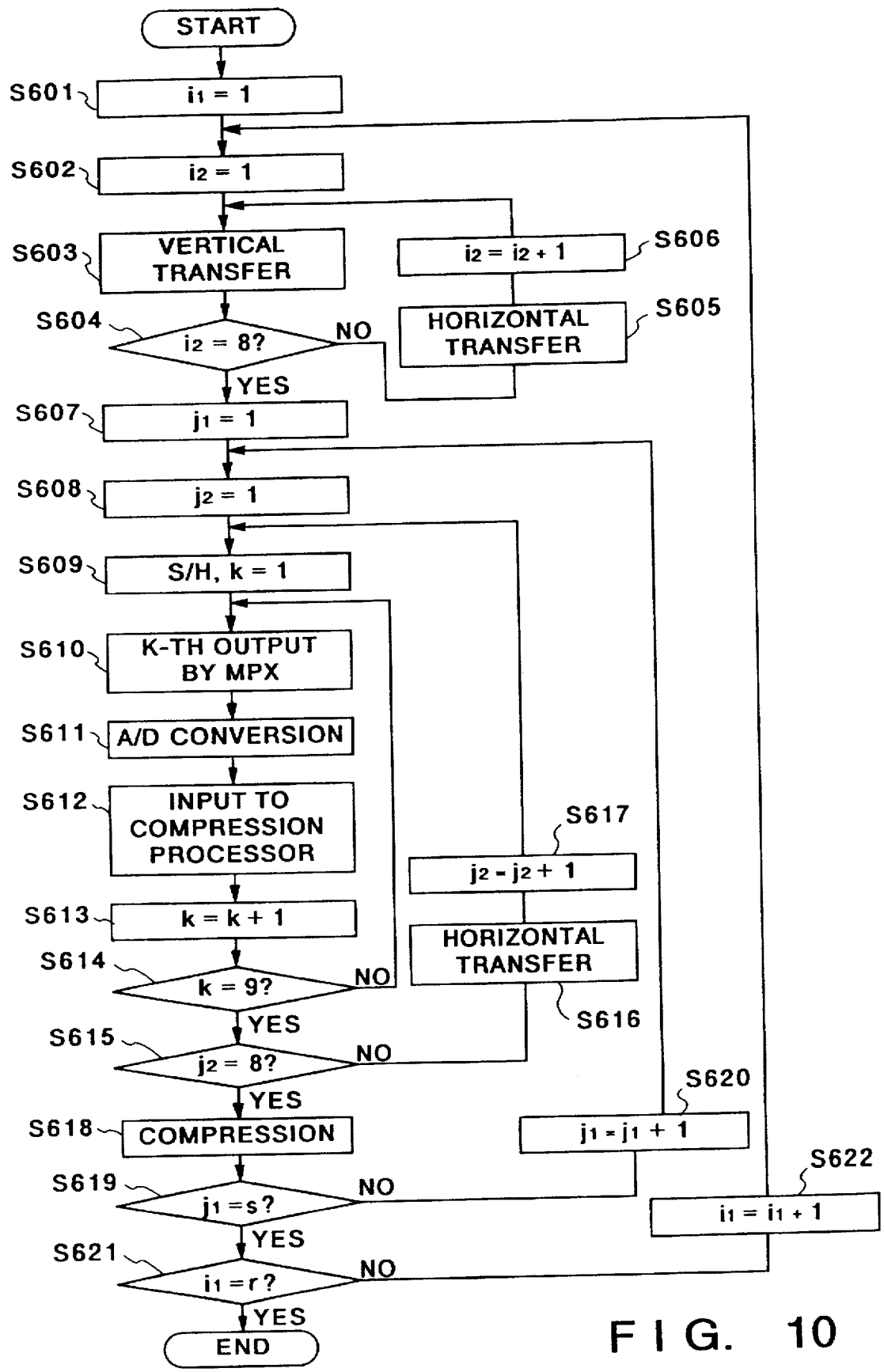
F I G. 10

| PIXEL No. | 500-1 | 500-2 | 500-3 | - - - - | 500-8 | |
|---|---|---|---|---|---|---|
| 1 | $Q_{1,1}$ | $Q_{1,2}$ | $Q_{1,3}$ | - - - - - - - | $Q_{1,8}$ | |
| 2 | $Q_{2,1}$ | $Q_{2,2}$ | $Q_{2,3}$ | - - - - - - - | $Q_{2,8}$ | |
| 3 | $Q_{3,1}$ | $Q_{3,2}$ | $Q_{3,3}$ | - - - - - - - | $Q_{3,8}$ | $j_1 = 1$ |
| 4 | $Q_{4,1}$ | $Q_{4,2}$ | $Q_{4,3}$ | - - - - - - | $Q_{4,8}$ | |
| ⋮ | ⋮ | ⋮ | ⋮ | | ⋮ | |
| 8 | $Q_{8,1}$ | $Q_{8,2}$ | $Q_{8,3}$ | - - - - - - - | $Q_{8,8}$ | |
| 9 | $Q_{1,9}$ | $Q_{1,10}$ | $Q_{1,11}$ | - - - - - - - | $Q_{1,16}$ | |
| 10 | $Q_{2,9}$ | $Q_{2,10}$ | $Q_{2,11}$ | - - - - - - - | $Q_{2,16}$ | |
| 11 | $Q_{3,9}$ | $Q_{3,10}$ | $Q_{3,11}$ | - - - - - - - | $Q_{3,16}$ | $j_1 = 2$ |
| ⋮ | ⋮ | ⋮ | ⋮ | | ⋮ | |
| 16 | $Q_{8,9}$ | $Q_{8,10}$ | $Q_{8,11}$ | - - - - - - - | $Q_{8,16}$ | |
| ⋮ | ⋮ | ⋮ | ⋮ | | ⋮ | |
| n-7 | $Q_{1,n-7}$ | $Q_{1,n-6}$ | $Q_{1,n-5}$ | - - - - - - | $Q_{1,n}$ | |
| n-6 | $Q_{2,n-7}$ | $Q_{2,n-6}$ | $Q_{2,n-5}$ | - - - - - - | $Q_{2,n}$ | |
| ⋮ | ⋮ | ⋮ | ⋮ | | ⋮ | $j_1 = n'$ |
| n-1 | $Q_{7,n-7}$ | $Q_{7,n-6}$ | $Q_{7,n-5}$ | - - - - - - | $Q_{7,n}$ | |
| n | $Q_{8,n-7}$ | $Q_{8,n-6}$ | $Q_{8,n-5}$ | - - - - - - | $Q_{8,n}$ | |

FIG. 12

IMAGE DATA COMPRESSING APPARATUS HAVING A SENSOR SIZE MATCHING COMPRESSION PROCESSING BLOCK SIZE

This application is a continuation of application Ser. No. 08/004,671 filed Jan. 14, 1993, now abandoned, which is continuation of application Ser. No. 07/785,287 filed Oct. 30, 1991 now abandoned.

BACKGROUND OF THE INVENTION

This invention relates to a two-dimensional image sensor for reading an image of an object, and to an image processing system for performing digital processing on two-dimensional object information obtained by sub-scanning the image sensor.

It has recently become a general practice to digitize image signals, thereby developing a new possibility toward attaining images of higher quality and realizing a multi-functioned image processing apparatus.

In many cases, image signals to be digitized are grouped into blocks each equipped with a redundant code to prevent errors during signal transmission. Or, conversely, image signals are compressed on a block basis so as to reduce the transfer time and memory capacity.

Various methods of compressing image signals have been devised up till now; of these, DCT (a method based on the principle of real part in fast Fourier transform) is being most widely adopted since it can be realized with ease in a hardware form. Apart from the compression processing, various types of image processing operations are now being carried out on a block basis.

There are a lot of image processing operations such as smoothing, edge detection, etc. which are carried out on a block basis, other than the compression operation described above.

Image information can be obtained in the form of electrical signals by means of a two-dimensional imaging device or an image pickup tube. Alternatively, it is possible to obtain two-dimensional object information by sub-scanning a line sensor or by using an interline-type CCD.

In the latter case, where two-dimensional object information is obtained by sub-scanning a line sensor or by using an interline-type CCD, one of the following methods has conventionally been adopted when performing an image processing operation on a block basis as mentioned above, e.g., compression, on the image information obtained.

First, a conventional method for the case where a line sensor is used will be described.

FIGS. 1A and 1B illustrate a conventional line-sensor scanning method and a signal reading method which are used when compressing object image information having a size of n×M on a block basis, with each block consisting of 8×8 pixels.

This prior art example uses a line sensor 113, which consists of a one-line-type image sensor having n pixels arranged in the main scanning direction (the X-direction in the drawing). By performing sub-scanning in the Y-direction (the sub-scanning direction) through a length corresponding to M pixels in total with this sensor 113, object information corresponding to n×M pixels can be obtained. The sub-scanning starts at the left end (m=1) (as seen in the drawing), while the line sensor 113 gradually advances to the right. First, the line sensor 113 reads the image information of the first column ($a_{11}, a_{21}, \ldots a_{n1}$), and the information thus read is converted to digital data by an A/D converter 110 before it is stored in a buffer memory 111. Afterwards, the line sensor 113 goes on to move in the sub-scanning direction, through a distance corresponding to one pixel (one line) at one time. In this way, the image information of the second column ($a_{12}, a_{22}, \ldots a_{n2}$), that of the third column ($a_{13}, a_{23}, \ldots a_{n3}$), etc. are taken by the line sensor 113, digitized, and stored in the buffer memory 111, column by column, until the buffer memory 111 has stored the image information of the first to the seventh column ($a_{17}, a_{27}, \ldots a_{n7}$). When, at the position where m=8, the image information of the eighth column ($a_{18}, a_{28}, \ldots a_{n8}$) is read, a block of 8×8 pixels is formed on a compression processor 112.

The block formation is effected as follows: First, of the image information of the first to the seventh column, which has been stored in the buffer memory 111 before the reading of the image information of the eighth column ($a_{11}, a_{28}, \ldots a_{n8}$), that portion of image information which corresponds to the first to the eighth row (as counted from above) ($a_{11}, a_{12}, \ldots a_{17}; a_{21}, a_{22}, \ldots a_{27}; \ldots$; and $a_{81}, a_{82}, \ldots a_{87}$) is transferred to the compression processor 112. Afterwards, that portion of the image information of the eighth column ($a_{18}, a_{28}, \ldots, a_{n8}$) taken by the line sensor 113 which corresponds to the first to the eighth row (as counted from above) ($a_{18}, a_{28}, \ldots, a_{88}$) is read out, digitized by the A/D converter 110, and transferred to the compression processor 112.

In this way, a digital-signal block of 8×8 pixels is formed on the compression processor 112, and the compression of this block is performed.

Afterwards, another block of 8×8 pixels is formed in the same manner on the compression processor 112 out of those pixels in the buffer memory 111 which correspond to the ninth to the fifteenth row (as counted from above) ($a_{91}, a_{92}, \ldots, a_{97}; a_{101}, a_{102}, \ldots, a_{107}; \ldots,$ and $a_{151}, a_{152}, \ldots, a_{157}$) and the newly read ones ($a_{161}, a_{162}, \ldots, a_{167}$), the block thus formed being compressed likewise.

When the image information of the first to the eighth column (m=1~8) has been entirely compressed from the first to the n-th row, object information corresponding to the ninth (m=9) to the sixteenth (m=16) column is now supplied to the buffer memory 111 and compressed in the same manner as the image information of the first to the eighth column. By repeating the above operations up to the M-th column, the entire image information is compressed.

Next, a conventional image processing method using an inter-line-type CCD will be described with reference to FIGS. 2A and 2B.

The example shown uses an interline CCD 301, which comprises: a light receiving section 302 composed of m×n pixels, with n pixels being arranged in the horizontal direction (the X-direction) and m rows of pixels in the vertical direction; a horizontal shift register 303 adapted to transfer a signal charge corresponding to one row in the horizontal direction at one time; and an amplifier 304 for amplifying the output of the shift register 303. Here, the signal charge at the position of the i-th row and the j-th column on the CCD 301 will be expressed as $Q_{ij}$.

The reading of signal charge from this inter-line CCD 301 is performed as follows: First, the signal charges of the n pixels in the first row (as counted from below) ($Q_{11}, Q_{12}, \ldots, Q_{1n}$) are transferred to the horizontal shift register 303. Afterwards, the respective signal charges of these pixels are transferred, pixel by pixel, to the left (as seen in the drawing) by the horizontal shift register 303, and supplied through the amplifier 304 to an A/D converter 305, where they are digitized. Afterwards, they are supplied to a buffer memory 306. When all the signals of the n pixels in the first row have been outputted by this horizontal transfer, the signals of a second row ($Q_{21}, Q_{22}, \ldots, Q_{2n}$) are transferred to the horizontal shift register 303 and read in the same manner as those of the first row.

That is, the reading of image information from the inter-line CCD 301 is effected on a row-basis. The reading is continued in this way, until 7×n items of data ($Q_{11}, Q_{12}, \ldots, Q_{1n}; Q_{21}, Q_{22}, \ldots, Q_{2n}; \ldots;$ and $Q_{71}, Q_{72}, \ldots, Q_{7n}$) are stored in the buffer memory 306.

When the signals of the eighth row ($Q_{81}, Q_{82}, \ldots, Q_{8n}$) have been outputted from the shift register 303, they are transferred to a compression processor 307 along with that portion of the read image information which corresponds to the first to the eighth column ($Q_{11}, Q_{12}, \ldots, Q_{18}; Q_{21}, Q_{22}, \ldots, Q_{28}; \ldots;$ and $Q_{81}, Q_{82}, \ldots, Q_{88}$).

The operations to follow are the same as those of the line sensor described with reference to FIGS. 1A and 1B. That is, blocks of 8×8 pixels are formed on the compression processor 307 through the buffer memory 306, and then the information contained therein is compressed. By repeating these operations, the image information corresponding to one picture frame is entirely compressed.

As described above, these prior-art image processing methods, whether using a line sensor or an inter-line-type CCD, requires a buffer memory whenever image processing such as compression is performed on the read image; the situation has been an obstruction to reduction in apparatus size and costs. Furthermore, it has been a factor complicating the buffer memory control.

In the case of the line memory described above, data compression in blocks, for example, of 8×8 pixels each, requires a buffer memory for seven lines (columns). And, the data of the first to the seventh column is first stored in the buffer memory before being supplied to the compression processor, whereas the data of the eighth column is directly supplied to the compression processor, without being stored in the buffer memory. That is, the manner in which image signals are read is different for one category of data to the other, thus complicating the reading control.

In the case of the inter-line-type CCD, a single sense line (route) is used for the reading of image data from the columns of image sensing elements, so that, when performing data compression in blocks, for example of 8×8 pixels each, a buffer memory for seven rows is required. If there were two or three sense lines (reading routes), the requisite capacity of the buffer memory might be reduced; however, the necessity of a buffer memory would then remain all the same.

Furthermore, there is a problem that the reading control is rather complicated, which is due, for example, to the fact that the manner in which image signals are read is changed according to whether the image signals are just stored in the buffer memory, as in the case of the first to the seventh row, or they are directly supplied to the compression processor without being stored in the buffer memory, as in the case of the eighth row.

It should be further noted that while, in the above-described prior-art examples, the size of each of the blocks for image processing was eight pixels, the above problems in the prior art have nothing to do with the size of the blocks.

SUMMARY OF THE INVENTION

The present invention has been made in view of the above problems in the prior-art techniques. It is accordingly an object of this invention to provide an image sensor and an image sensing system which allow digital signal processing of image information to be performed on a block basis, without using any buffer memory or the like and with a simplified reading control.

Another object of this invention is to provide an image sensor for use in a system which performs image processing on a block basis, in which the size of the image sensor matches with one side of each of the blocks constituting the units for the image processing.

A still further object of this invention is to provide a two-dimensional image sensor for use in a system which performs image processing on a block basis, the image sensor being equipped with a number of lines of shift registers which is equal to the number of pixels in one side of each of the blocks constituting the units for the image processing, thereby making it possible to dispense with a special buffer memory or the like for the image processing.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 10 is a flowchart showing control procedures for a controller in the second embodiment; and FIGS. 11 and 12 are diagrams showing how, in the image sensor of the second embodiment, data is transferred from the light receiving section to a shift register group.

PREFERRED EMBODIMENTS OF THE INVENTION

Two embodiments of the image sensor and image sensing system of the present invention will now be described as applied to an image data compressor. In the first embodiment, the present invention is applied to a scanning-type CCD image sensor (linear image sensor), and, in the second embodiment, it is applied to an inter-line-type CCD image sensor (area image sensor).

While they differ from each other in that the former requires sub-scanning while the latter does not, these first and second embodiments have the common advantage of not requiring any buffer memory between the CCD image sensor and the image compressor and of facilitating the reading control over the CDD. Further, both of these embodiments perform image compression, as an example of an image processing on a block basis, with one block consisting of 8×8 pixels.

[First Embodiment]

Figure 1A:
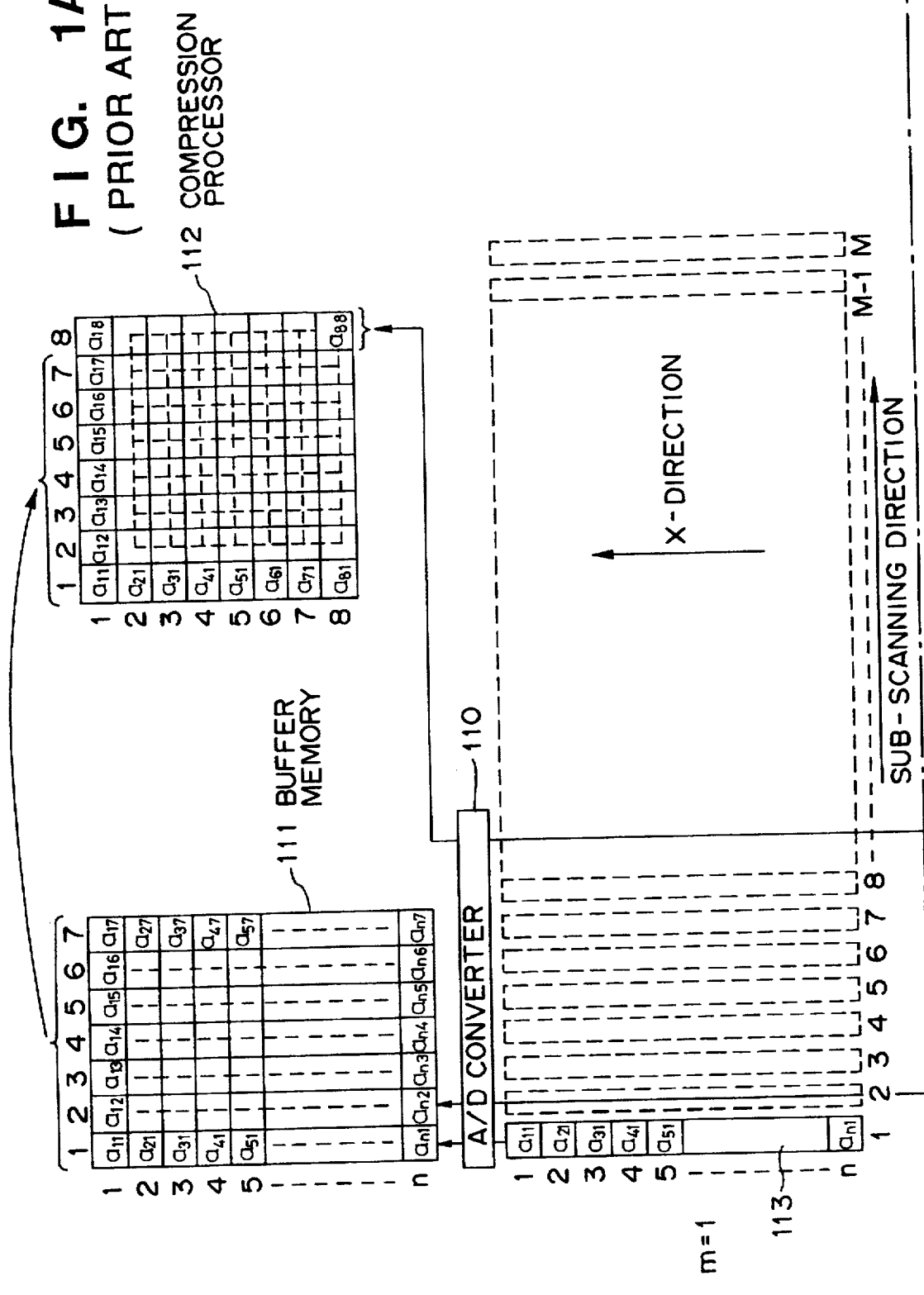
FIGS. 1A and 1B are diagrams illustrating a data treatment operation in a case where image processing is performed by using a conventional line-type image sensor.
Figure 1B:
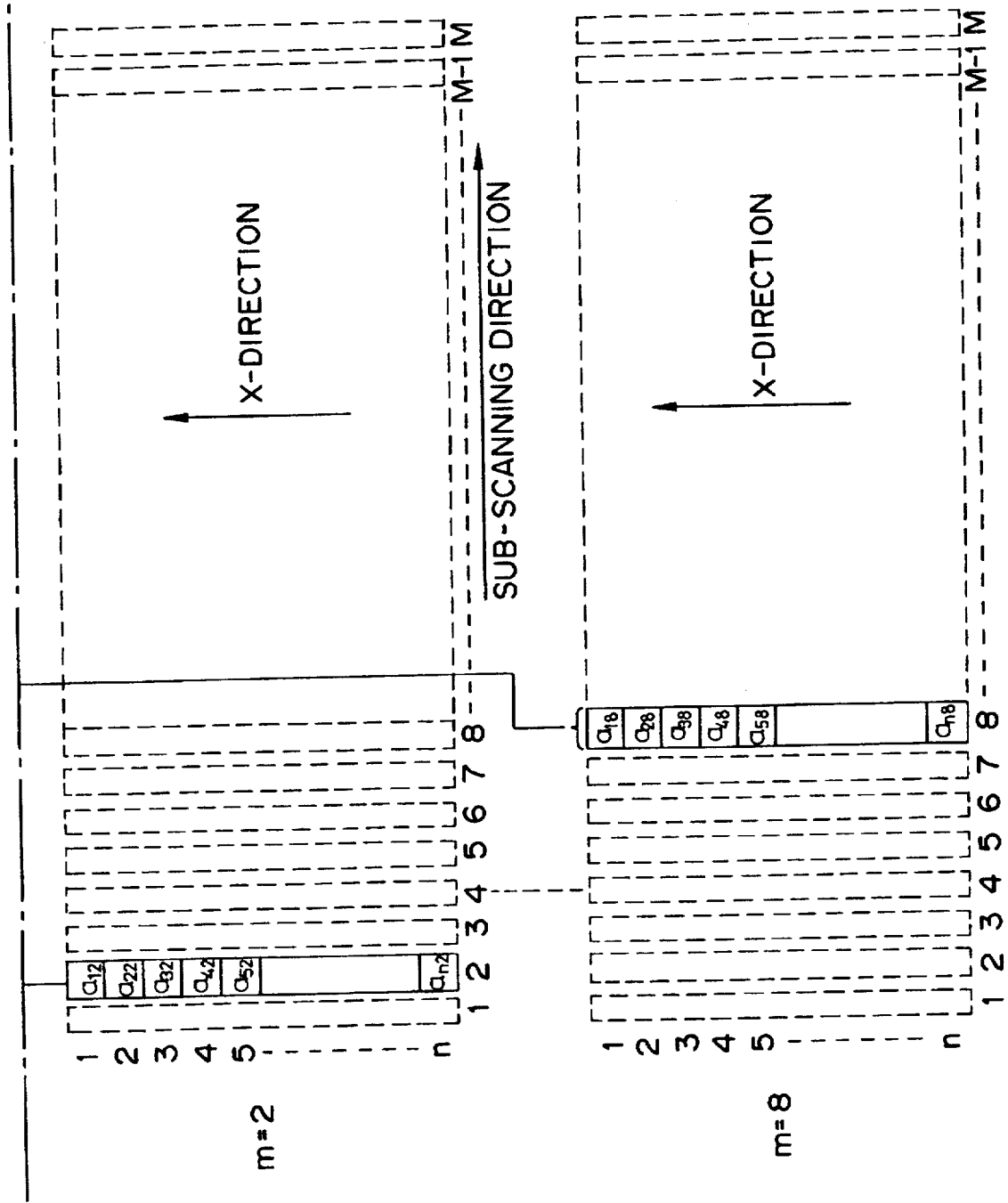
Figure 2A:
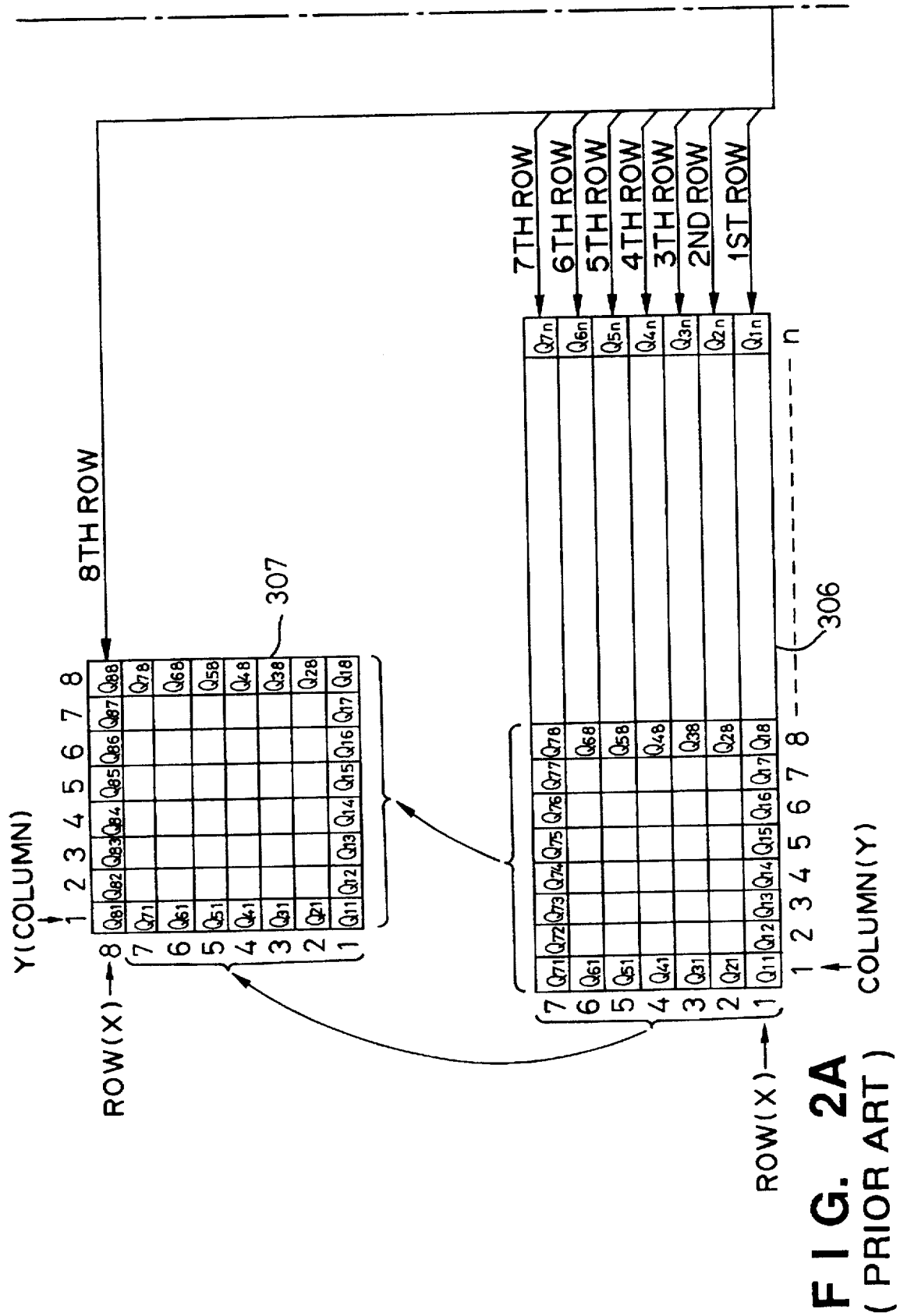
FIGS. 2A and 2B are diagrams illustrating a data treatment operation in a case where image processing is performed by using a conventional inter-line-type image sensor.
Figure 2B:
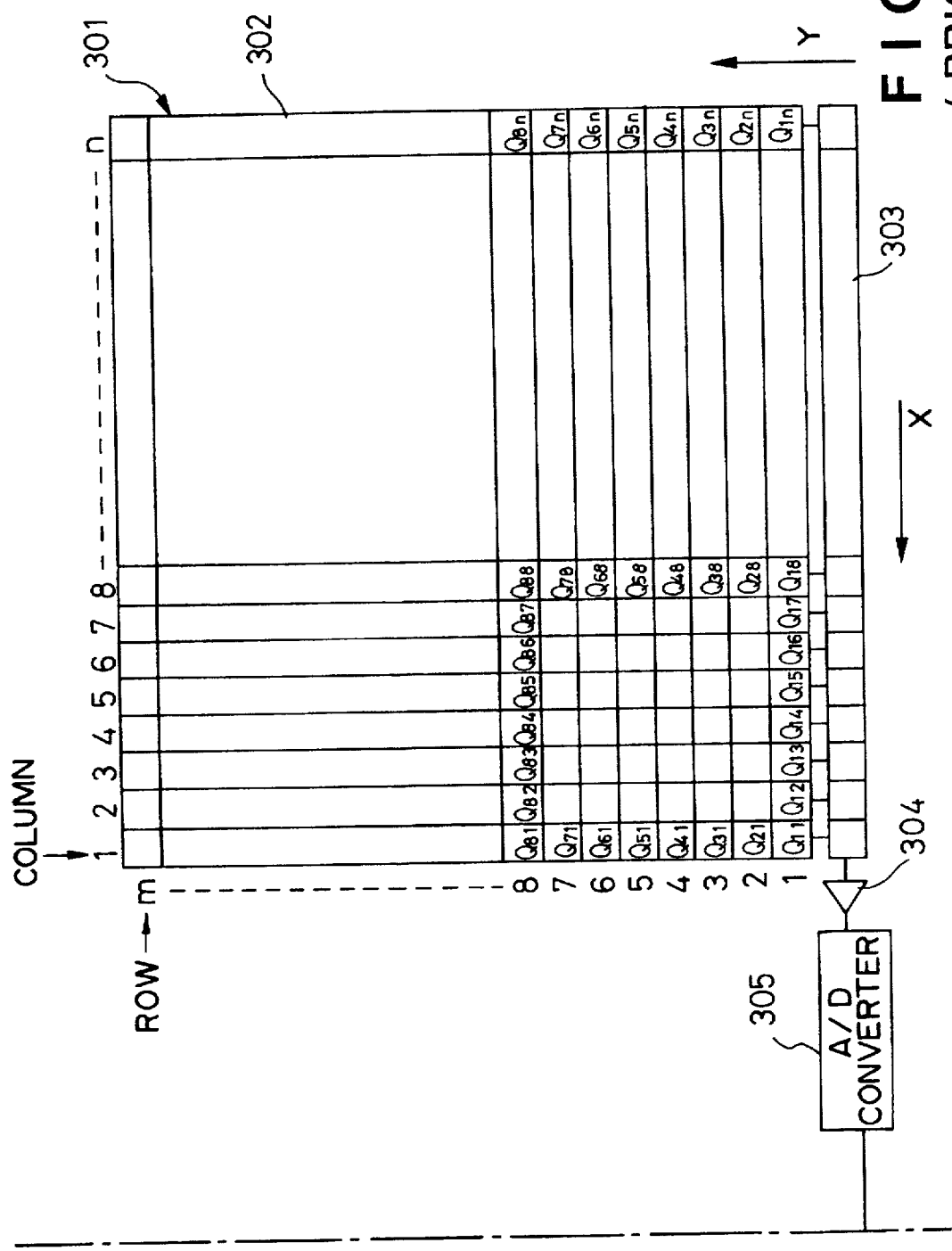
Figure 3:
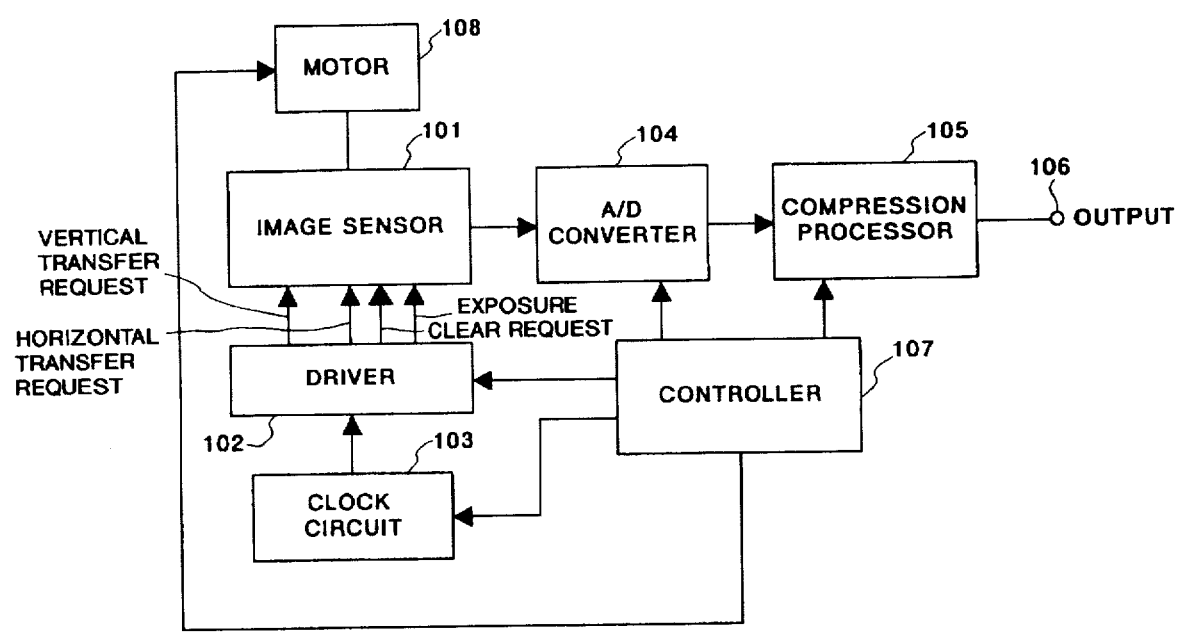
FIG. 3 is a block diagram showing the configuration of an image sensing system in accordance with a first embodiment of this invention.

FIG. 3 is a block diagram showing the configuration of an image sensing system in accordance with the first embodiment.

In the drawing, the image sensing system shown includes: an image sensor 101 having a size of n×8; a driver 102 for transferring the image sensor 101 in the vertical and horizontal directions; a clock circuit 103 for generating various timing signals; an A/D converter 104 connected to the image sensor 101; and a compression processor 105, which is adapted to compress digital signals in blocks of 8×8 pixels each. Nowadays, compression processors are well known and available from a number of manufacturers, in the form of integrated circuits, so a detailed description of the compression processor 105 will be omitted here. The reference numeral 107 indicates a controller for controlling the entire image sensing apparatus; and the reference numeral 108 indicates a motor for moving the image sensor 101 in the sub-scanning direction.

Figure 4:
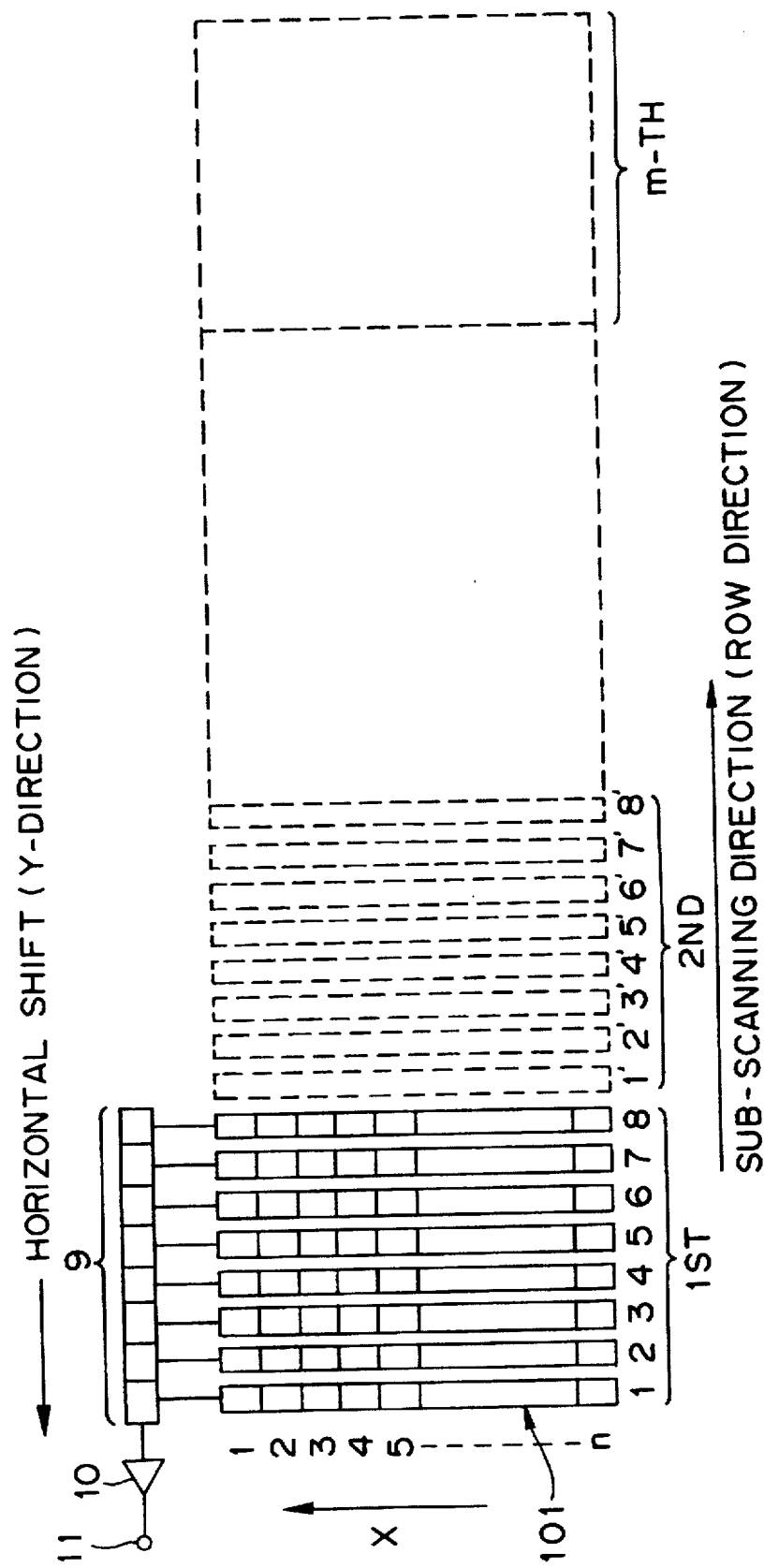
FIG. 4 is a diagram showing the construction of an image sensor used in the image sensing system of the first embodiment.

FIG. 4 is a diagram schematically showing the construction of the image sensor 101 of the system of the first embodiment. This image sensor 101 or CCD consists of eight light receiving sections 1 to 8, a shift register 9 for eight pixels, and an amplifier 10. The system shown in FIG. 3 performs image compression in blocks each having a size of 8×8 pixels. For this purpose, the image sensor 101 of FIG. 4 is equipped with eight line CCDs (light receiving sections) each composed of n photoelectric conversion elements and n transfer elements, arranged in the X-direction (the main scanning direction) (Hereinafter, a CCD element group constituting one line will be referred to as a "line CCD"). For convenience, these line CCDs will be referred to by the reference numerals 1 to 8. As stated above, each line CCD includes n photoelectric conversion elements and n transfer elements; one photoelectric conversion element and one transfer element associated therewith correspond to one pixel. In each line CCD, the numbers 1, 2, ..., n are allotted to the pixels, from the one nearest to the shift register 9. In the system of FIG. 4, the compression of image signals is performed in blocks of 8×8 pixels each, so that the number of lines of the sensor 101 is equal to the number of pixels in one side of each block constituting the unit for compression.

As stated above, each of the line CCDs 1 to 8 includes n photoelectric conversion elements and n transfer elements, and the electric charges on the conversion elements are shifted sequentially. And the items of image data stored in each of the line CCDs 1 to 8 are sequentially supplied to the shift register 9, in the order of the numbers allotted to the pixel positions of each line CCD. The eight signal charges read from each of the line CCDs 1 to 8 by the shift register 9 are sequentially shifted to an amplifier 10. In the example shown in FIG. 4, the shift register 9 shifts electric charge in the horizontal direction, so it will be referred to as the "horizontal shift register". For convenience, the electric charge transfer from the line CCDs 1 to 8 toward the horizontal shift register 9 will be referred to as the "vertical transfer", and the transfer of the electric charges of the horizontal shift register 9 toward the amplifier 10 will be referred to as the "horizontal transfer".

As shown in FIG. 3, the interface signals between the image sensor 101 and the driver 102 include a "horizontal transfer request" signal, a "vertical transfer request" signal, a "clearing request" signal, an "exposure request" signal, etc. The controller 107 controls the driver 102 to cause it to generate these signals, thereby controlling the image sensor 101.

Figure 5A:
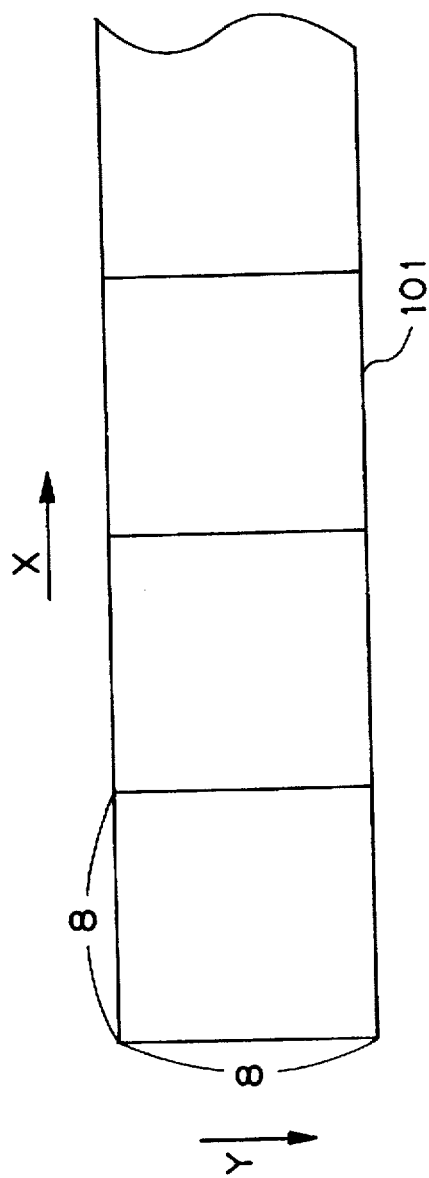
FIGS. 5A and 5B are diagrams illustrating the size of the image sensor used in the system of the first embodiment as compared to the size of each of the blocks used in the image processing performed therein.
Figure 5B:
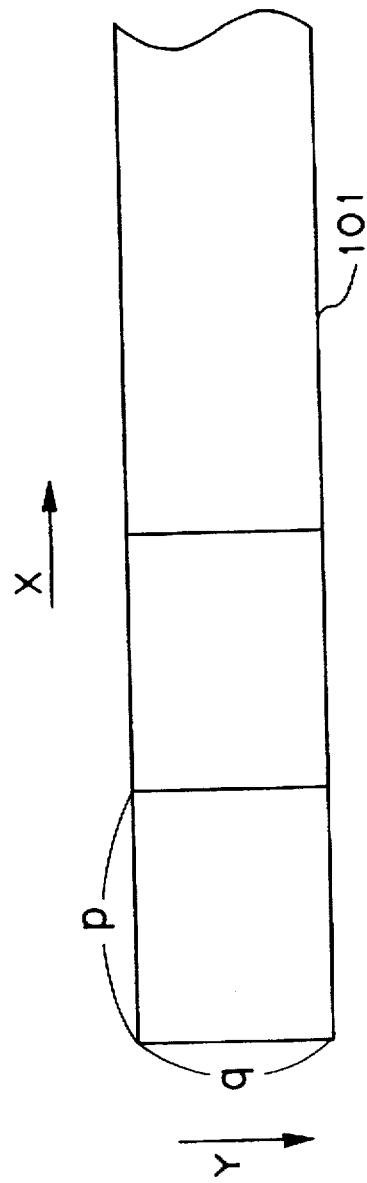

FIGS. 5A and 5B show the relationship between the sensor 101 and the size of the block constituting the unit for compression. Of these drawings, FIG. 5A shows the relationship between the block constituting the unit for the compression effected in the system of FIG. 3 and the size of the sensor 101 of FIG. 3. In FIG. 5A, the length in the Y-direction of the block agrees with the number of lines in the Y-direction of the image sensor 101; since the length in the X-direction of the block is eight pixels, it is desirable that n, which is the length in the X-direction of the image sensor 101, be a multiple of 8.

Generally, assuming that the size of the block in the X- and Y-directions is p×q, the number of lines of the image sensor 101 must be q.

In the system of FIG. 3, the image sensor 101 is scanned in the sub-scanning direction (the direction opposite to the X-direction). By scanning the image sensor 101 in this direction, the system of FIG. 3 can take in two-dimensional object information. When the sub-scanning has been performed m times, as shown in FIG. 4, the reading of two-dimensional image information is complete.

Figure 6:
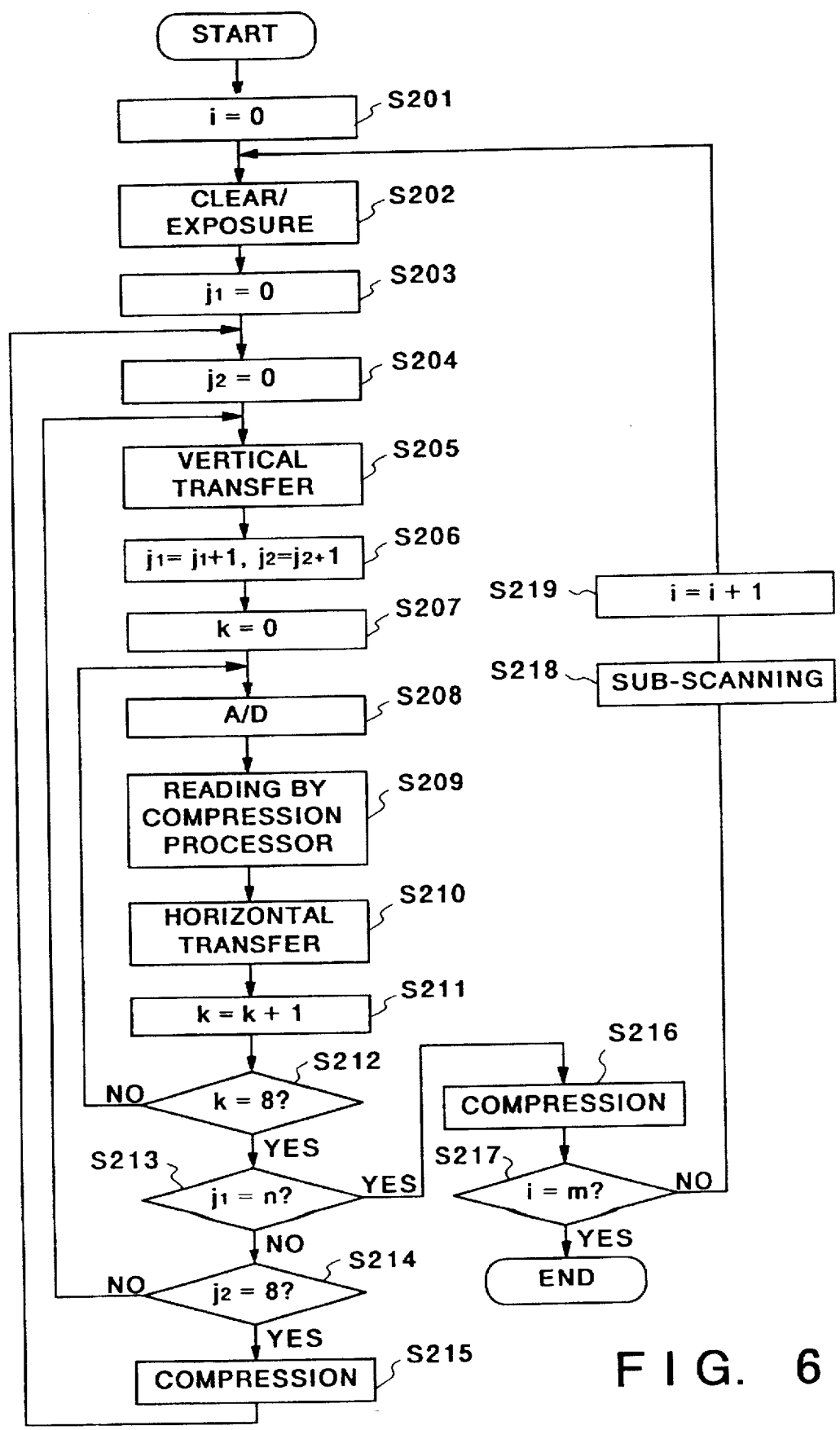
FIG. 6 is a flowchart showing control procedures for a controller in the first embodiment.

The operation of the image sensing system of the first embodiment will now be described with reference also to the flowchart of FIG. 6.

First, a variable i for controlling the number of sub-scannings is cleared to 0 (Step S201). When this variable i has become equal to m, the image sensing of the object is complete (Step S217). That is, this object has a size of n×8m pixels.

Figure 7:
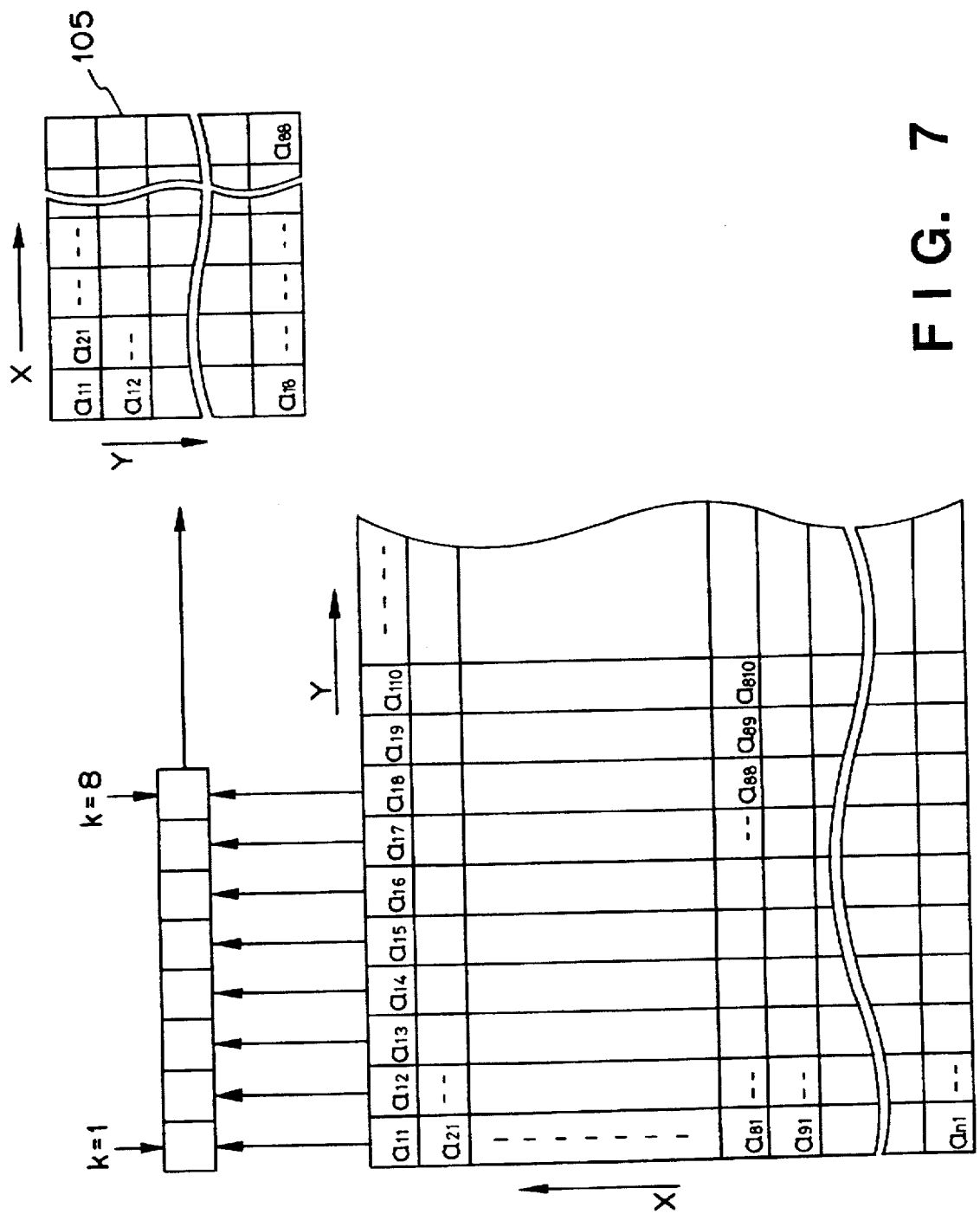
FIG. 7 is a diagram illustrating how, in the first embodiment, data is transferred from the image sensor through a shift register to an image processor.

Next, the electric charges of the image sensor 101 (shown in FIG. 3) are cleared by the driver 102 and then the exposure is effected for a predetermined period of time (Step S202). As a result of this exposure, image data is stored on the n×8 pixels of the image sensor 101, as shown in FIG. 7.

Next, a variable $j_1$ for controlling the vertical transfer is cleared to 0 (Step S203). As stated above, the vertical transfer is the transfer in the X-direction inside the line CCD having a length of n pixels. Accordingly, when $j_1$ has become equal to n (Step S213), it implies that the image data of all the pixels obtained at one exposure has been transferred to the compression processor 105.

In Step S204, a variable $j_2$ for dividing the image data of all the pixels obtained at one exposure into eight blocks is cleared to 0.

In Step S205, the driver 102 is instructed to generate a "vertical transfer request" signal, causing the image sensor 101 to transfer electric charge corresponding to one row in the vertical direction. Thus, when the variables $j_1$ and $j_2$ are both 0, the uppermost row ($a_{11}, a_{12}, \ldots, a_{18}$) is read out by the horizontal shift register 9.

In Step S206, the variables $j_1$ and $j_2$ related to the vertical transfer control are respectively incremented by one in order to indicate that vertical transfer has been performed once. The loop of Steps S208–S212 constitutes the procedures for transferring the eight items of image data of the shift register 9 pixel by pixel to the compression processor 105.

For this purpose, a variable k for controlling the horizontal transfer is first cleared to 0 in Step S207.

The loop of Steps S208~S212 is executed each time the vertical transfer of one row is effected; the image data of the pixel to be transferred is first stored at the left end of the horizontal shift register 9 and supplied to an output terminal 11 through the amplifier 10. In Step S208, the signal representing this image data is converted to a digital signal by the A/D converter 104. Afterwards, the compression processor 105 reads the data in Step S209. When the variables $j_1$, $j_2$ and k are all 0, it is the pixel a11 that is to be transferred to the processor 105.

In Step S210, a "horizontal transfer request" signal is supplied to the image sensor 101 through the driver 102 in order to read the next pixel. When the image sensor 101 receives this request signal, the horizontal shift register 9 transfers signal charges horizontally to the left through a distance corresponding to one pixel. In Step S211, the variable k for controlling the horizontal transfer is incremented by one so as to indicate that a horizontal transfer has been effected.

Next, a judgment is made as to whether k=8 or not (Step S212).

The operations of Steps S208 to S212 are repeated until k becomes 8. If k=8 in Step S212, it implies that the reading of all the image data on the horizontal shift register 9 has been read by the processor 105. If, for example, k=8 when $j_1$ and $j_2$ are both 0, it implies that the image data of $a_{11}$, $a_{12}$, ..., $a_{18}$ has been transferred to the processor 105. FIG. 7 shows how the image data of $a_{11}$, $a_{12}$, ..., $a_{18}$ is transferred in the Y-direction to the internal memory of the processor 105.

In Step S213, a judgment is made as to whether the variable $j_1$ for controlling the vertical transfer is equal to n or not, that is, whether the image data of all the rows of the line CCDs 1 to 8 has been read by the processor 105 or not.

If $j_1$ is not equal to n (i.e., "NO" in Step S213), it implies that the image data of the n×8 pixels of the line CCDs 1~8 has not entirely been transferred yet; in that case, a judgment is made in Step S214 as to whether the variable $j_2$ for controlling the blocks for each eight pixels is 8 or not.

If $j_2 \neq 8$ (Step S214), it implies that the end of a 8×8 block has not been attained yet, so that the procedure returns to Step S205 to repeat the loop of vertical transfer, horizontal transfer and reading.

If it is determined in Step S214 that $j_2$=8, it implies that the image data of 8×8 pixels has entirely been transferred to the processor 105, so that, in Step S215, the controller 107 instructs the processor 105 to start compression. The processor 105 outputs the result of the compression through a terminal 106. This output is supplied to a memory and stored therein, or connected to a communication line and transmitted as data.

When the compression of one block has been completed (Step S215), the procedure returns to Step S204, and the reading of data from the image sensor 101 by the compression processor 105 is performed again on a block basis.

When the image data of the eight line CCDs has entirely been transferred to the processor by this process, that is, when $j_1$ has become n in Step S213, the procedure moves on to Step S216, where the compression of the last block is started. When the last block is short of 8×8 pixels, the image data of the missing pixels is entirely nullified, or else compensated for by interpolation before compressing this last block. This, however, can be avoided if the number of pixels of the image sensor 101 is previously set to a multiple of 8.

Next, a judgment is made, in Step S217, as to whether the variable i for controlling the sub-scanning is equal to m or not, i.e., whether the image data of the object has been entirely transferred to the processor 105 or not.

If i is not equal to m, it implies that the transfer of the image data of the entire object has not been completed yet, so that, in Step S218, the motor 108 is driven so as to sub-scan the image sensor 101 to the right through a distance corresponding to the width of the line CCDs 1 to 8 (i.e., the width of eight pixels).

In Step S219, the variable i for controlling the sub-scanning is incremented by one in order to indicate that sub-scanning has been performed once, and the operations of Step S202 onwards are executed again.

If i=m in Step S217, the reading and compression of the pixels of the entire frame are complete, so that the operation is terminated.

In this way, image signals are digitized and compressed.

Thus, according to the first embodiment, the number of lines of the image sensor 101 agrees with the number of pixels in one side of each block serving as the unit for signal compression, so that no buffer memory is required, with the reading control being simplified.

[Second Embodiment]

The second embodiment is applied to an image sensing device of an interline-transfer type. Also in this second embodiment, the present invention is applied to an image compression system.

Figure 8A:
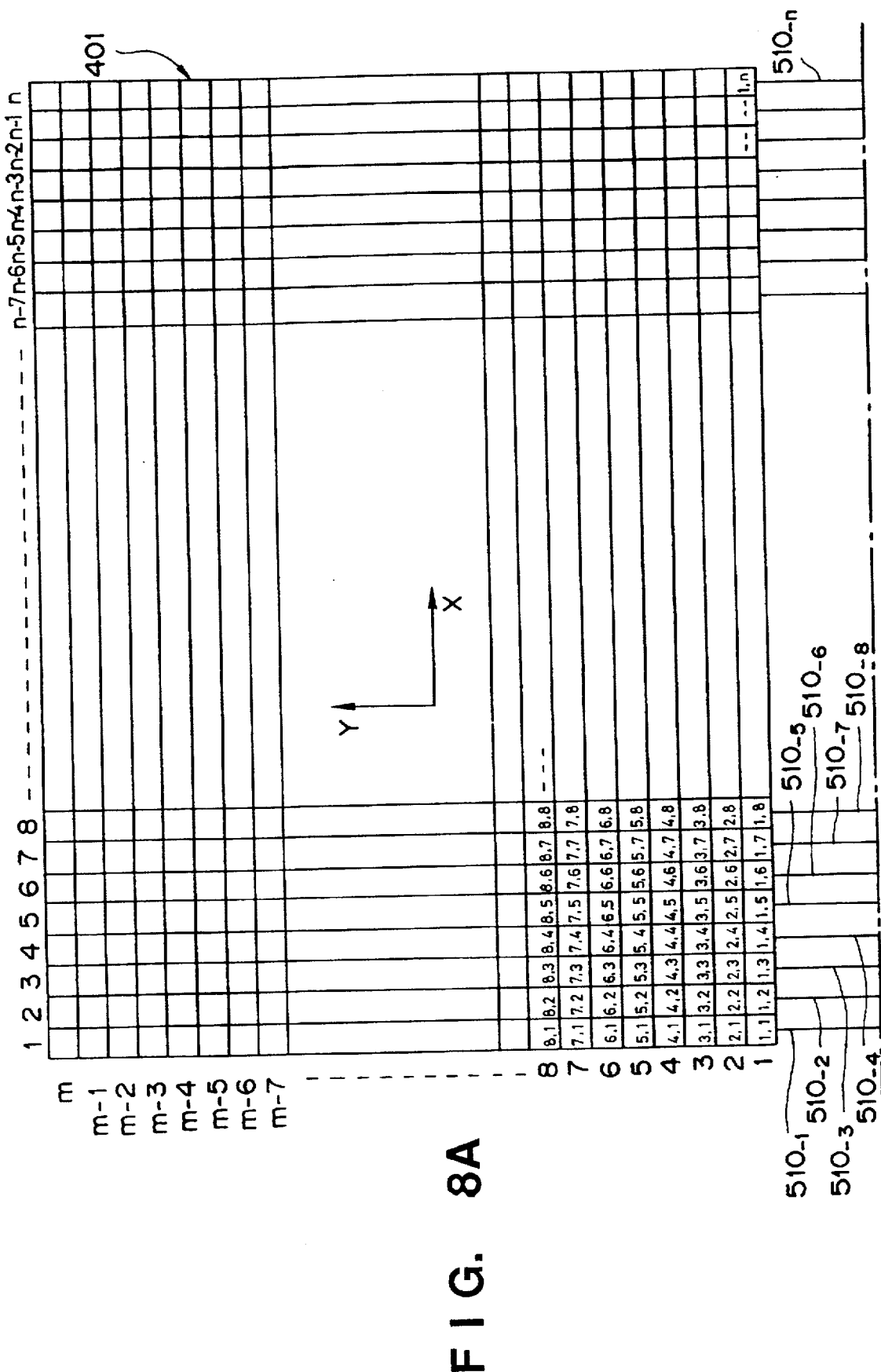
FIGS. 8A and 8B are diagrams schematically showing the pixel layout of an image sensor used in a second embodiment.
Figure 8B:
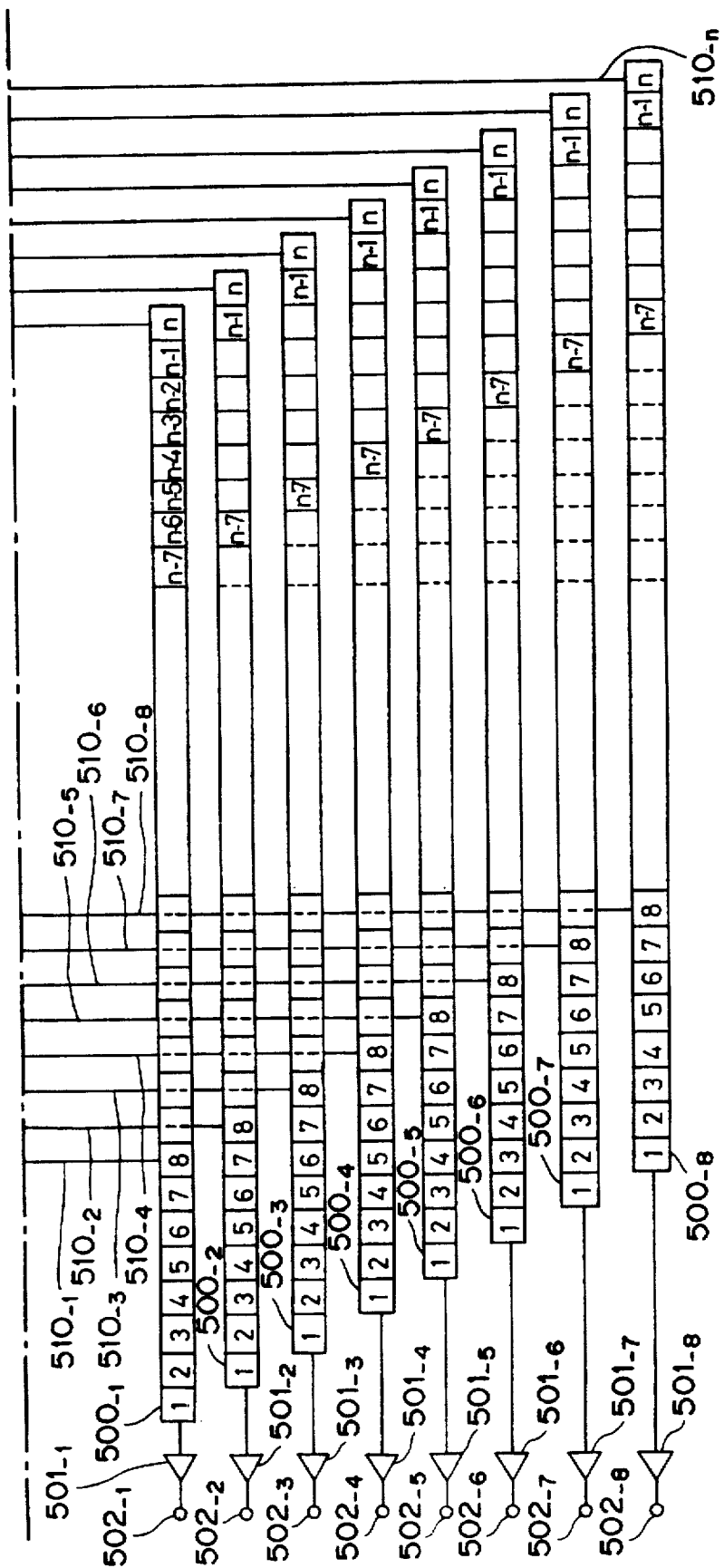

FIGS. 8A and 8B are diagrams schematically showing the construction of an image sensor 400, which is used in the second embodiment. While the second embodiment will be described here as applied to an image sensor of an interline-transfer type, the same thing also applies to a case where an image sensor of a frame-transfer type is used (a description of the latter case will be omitted here). Further, this embodiment is also applicable to other types of area sensors, such as an MOS-type, a BASIS-type, etc.

In FIGS. 8A and 8B, the image sensor 400 includes: a light receiving section 401, which has a length in the X-direction (the main scanning direction) of n pixels and a length in the Y-direction (the sub-scanning direction) of m lines; eight shift registers ($500_{-1}$ to $500_{-8}$); eight amplifiers ($501_{-1}$ to $501_{-8}$); and eight output terminals ($502_{-1}$ to $502_{-8}$). For the sake of clarity, it is assumed here that m and n are both multiples of eight. Each component unit of this light receiving section consists of one photoelectric conversion element and one transfer element associated therewith. With this construction, the image sensor 400 is capable of sequentially shifting accumulated electric charge in the Y-direction in FIG. 8A. The first to the n-th column of the light receiving section 401, each extending in the Y-direction, are connected to the eight shift registers ($500_{-1}$~$500_{-8}$) each having a capacity for n pixels. The number of elements in each of these shift registers is n, which is the same as the number of pixels in the horizontal direction. For convenience, these elements are numbered as 1, 2, ..., n, from the left.

As shown in FIG. 8B, the eight shift registers ($500_{-1}$~$500_{-8}$) are connected to the light receiving section 401 in the manner as shown in the following table:

| Register No. | Range of light receiving section covered |
| --- | --- |
| 500-1 | From 1st to (n − 7)th column |
| 500-2 | From 2nd to (n − 6)th column |
| 500-3 | From 3rd to (n − 5)th column |
| 500-4 | From 4th to (n − 4)th column |

-continued

| Register No. | Range of light receiving section covered |
| --- | --- |
| 500-5 | From 5th to (n - 3)th column |
| 500-6 | From 6th to (n - 2)th column |
| 500-7 | From 7th to (n - 1)th column |
| 500-8 | From 8th to n-th column |

That is, the data stored in the first to the (n−7)th column of the light receiving section 401 is supplied to the eighth to the n-th column of the shifter register $500_{-1}$. The data of the second to the (n−6)th column of the light receiving section 401 is supplied to the eighth to the n-th column of the shifter register $500_{-2}$. The data of the third to the (n−5)th column of the light receiving section 401 is supplied to the eighth to the n-th column of the shifter register $500_{-3}$. And the eighth to the n-th column of the light receiving section 401 are supplied to the eighth to the n-th column of the shifter register $500_{-8}$.

Further, the respective left-end elements of the horizontal shift registers $500_{-1}$, $500_{-2}$, . . . , and $500_{-8}$ are respectively connected to the input terminals of the amplifiers $501_{-1}$, $501_{-2}$, . . . , $501_{-8}$.

The respective output terminals $502_{-1}$, $502_{-2}$, . . . , and $502_{-8}$ of the amplifiers $501_{-1}$, $501_{-2}$, . . . , and $501_{-8}$ are connected to the next stage to emit the final output of the image sensor 400.

As stated above, m and n are both multiples of 8 and can be expressed as:

m=8r n=8s where r and s are integers.

Further, the pixel at the i-th row and the j-th column of the image sensor 400 is expressed as (i, j), with the stored charge (image data) thereof being expressed as $Q_{ij}$.

Figure 9:
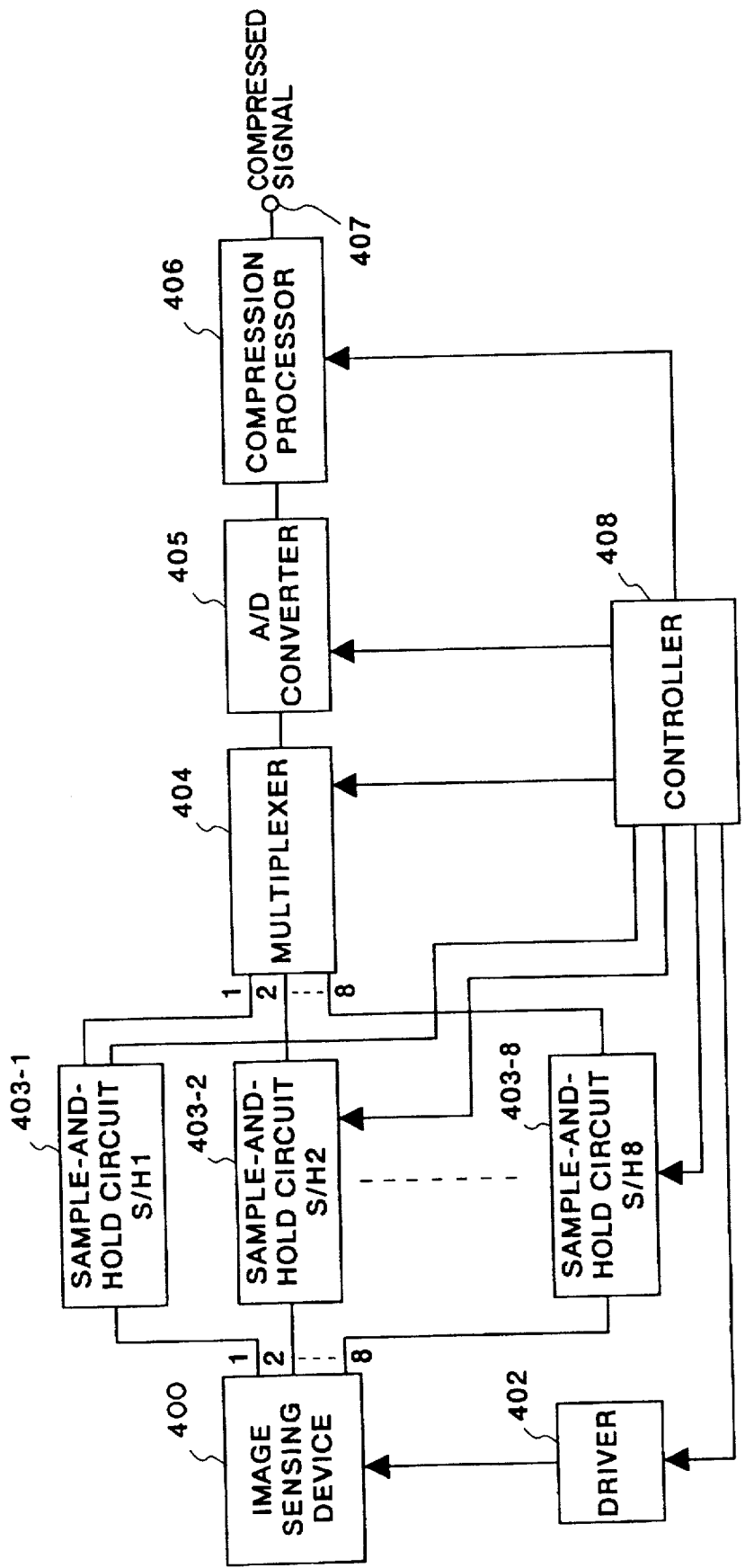
FIG. 9 is a block diagram showing the configuration of an image sensing system in accordance with the second embodiment.

FIG. 9 is a block diagram showing the configuration of the image sensing system of the second embodiment. In the drawing, the reference numeral 400 indicates an image sensor, the pixel layout of which is shown in FIG. 8A. This image sensor has eight output terminals, which correspond to the output terminals $502_{-1}$ to $502_{-8}$ of FIG. 8B. The reference numeral 402 indicates a driver for driving the image sensor 400; it is substantially the same as the driver 102 of the first embodiment.

The output terminals 1 to 8 of the image sensor 400 are respectively connected to the input terminals of sample-and-hold circuits $403_{-1}$ to $403_{-8}$, with the respective outputs of the sample-and-hold circuits being connected to the eight input terminals of a multiplexer 404. The output of the multiplexer 404 is supplied to the input terminal of an A/D converter 405, and the output of the A/D converter 405 is supplied to the input terminal of a compression processor 406. Emitted from the output terminal 407 of the compression processor 406 is the final output of this image sensing apparatus, with the output terminal 407 being connected to a memory, a transmission circuit, etc.

The reference numeral 408 indicates a controller for controlling the entire image sensing apparatus; it can be constructed with ease by using well-known circuits such as a general-purpose microprocessor, so a detailed description thereof will be omitted here.

Further, various compression processors are now available from different manufacturers, in the form of one-chip ICs; thus, like the processor 105 of the first embodiment, the compression processor 406 consists of a well-known component, so a detailed description thereof will be omitted here.

The operation of the image sensing system of the second embodiment, constructed as described above, will now be explained with reference also to the flowchart of FIG. 10.

The general flow of control process in this embodiment is as follows: first, the transfer in the vertical direction (the Y-direction in FIG. 8A) is effected in eight-row units. That is, image data corresponding to eight rows, corresponding to 8n pixels in total, is transferred to the horizontal shift registers $500_{-1}$, $500_{-2}$, . . . , and $500_{-8}$. And, when shifting the image data in the shift registers $500_{-1}$, $500_{-2}$, . . . , and $500_{-8}$ in the horizontal direction (the X-direction), the whole data is divided in the X-direction into s (=n/8 m/8) blocks, compression being effected in these blocks. By repeating this operation, the image data of the entire picture frame is compressed.

The procedures shown in the flowchart will now be explained one by one. As in the first embodiment, the "horizontal transfer" means the transfer in the X-direction of FIG. 8B, and the "vertical transfer" means the transfer in the Y-direction of FIG. 8A.

In Step S601 of FIG. 10, a variable $i_1$ for controlling the transfer in the vertical direction is set to 1. Then, in Step S602, a variable $i_2$ for controlling the vertical transfer line by line is set to 1.

The loop: Step S603→Step S604→Step S605→Step S606→Step S603 controls the process in which the image data corresponding to the first eight lines (s blocks) of the image sensor 400 is transferred to the shift register group $500_{-1}$ to $500_{-8}$. That is, in Step S603, the image sensor 400 is instructed to perform vertical transfer, and, in Step S605, the shift register group 500 is instructed to perform horizontal transfer; this is repeated until $i_2$ becomes equal to 8, when, the first block, the second block, the third block, . . . in the image sensor 400 are respectively transferred to the first block, the second block, the third block, . . . in the shift register group $500_{-1}$ to $500_{-8}$. And, the layout of signal charges on the horizontal shift registers at the stage where this operation has been completed is as shown in FIG. 12.

Next, in Step S607, a variable $j_1$ for controlling the number of blocks in the horizontal direction is set to 1, and, in Step S608, a variable $j_2$ controlling the horizontal transfer is set to 1.

In Step S609, the charge levels of the respective left-end elements of the horizontal shift registers, i.e., the data of the left-end oblique line in the W-direction (the direction inclined 45° in FIG. 11) of the shift register group $500_{-1}$ to $500_{-8}$, are respectively sample-held by the eight sample-and-hold circuits $403_{-1}$ to $403_{-8}$. In the loop of Steps S610 to S614, one of the eight items of image data held by the S/H circuits is selected by the multiplexer 404 (Step S410) and A/D-converted by the A/D converter 405 (Step S611). The digital data thus obtained is transferred to the processor 406 (i.e., the built-in memory thereof) (Step S612). The selection switching of the sample-and-hold circuits is effected by incrementing the variable k (Step S613).

Figure 11:
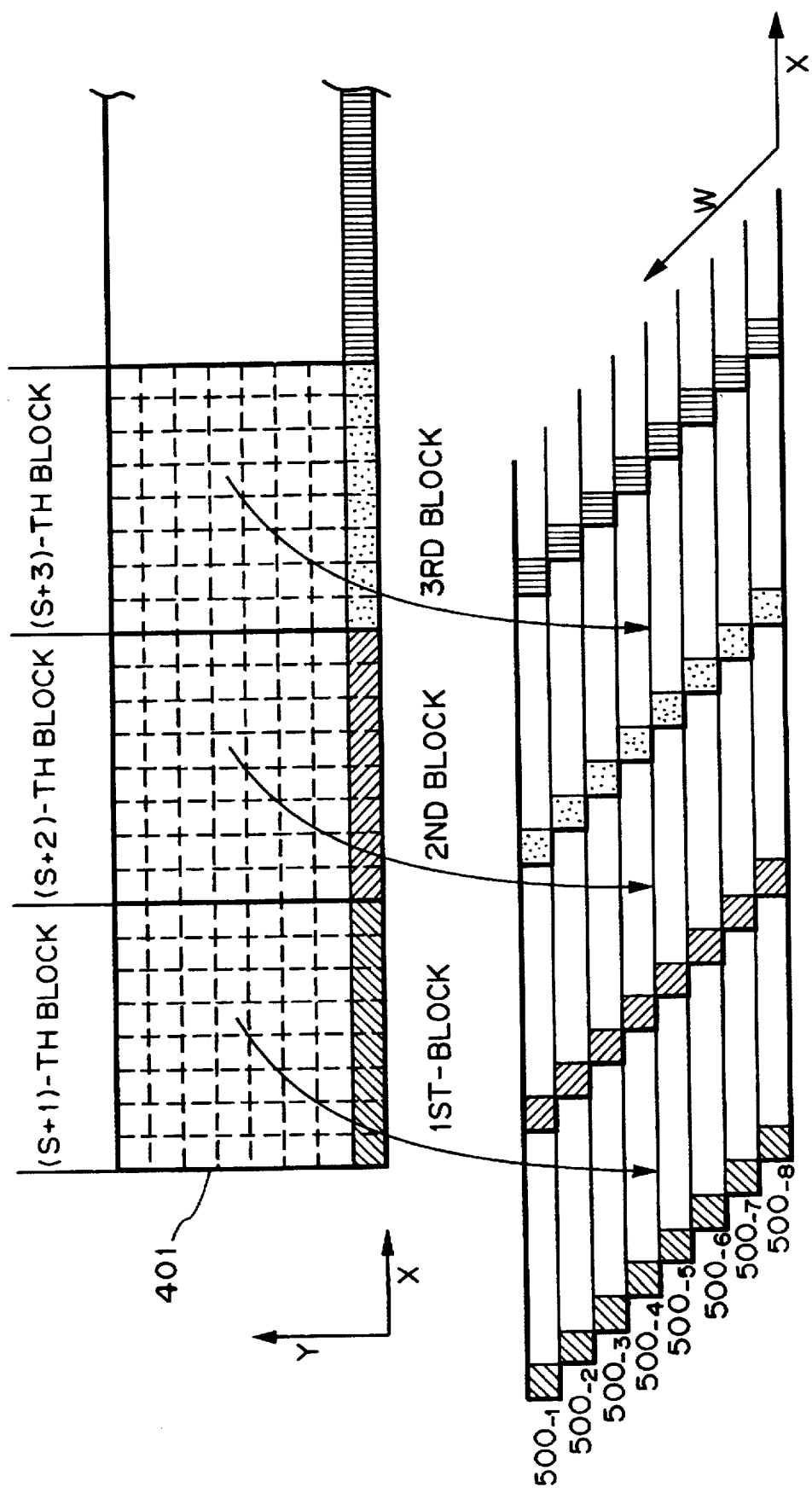

When the data of one oblique line in the W-direction of FIG. 11 has been transferred to the compression processor, the procedure moves on as: Step S614→Step S615→Step S616. In Step S616, the shift register group $500_{-1}$ to $500_{-8}$ is instructed to perform horizontal transfer. And, in Step S617, the variable $j_2$ for counting the number of columns in one block transferred in the X-direction is incremented. Then, the procedure returns to Step S609, where the sample-and-hold circuits and the variable k are initialized. In this way, the loop of Steps S610 to S614 is executed eight times.

The loop of Steps S609 to S615 is repeated until it is determined in Step S615 that the variable $j_2$=8.

When it is determined in Step S615 that $j_2=8$, it implies that one block, consisting of 8×8 pixels, has been stored in the internal memory (not shown) of the processor 406, so that, in Step S618, a compression command is transmitted to the processor 406. Thus, in Steps S602 to 618, one block is transferred to the processor 406 and compressed there.

It is checked, in Step S619, whether the counter $j_1$ for counting the number of processed blocks has attained the predetermined value s. As stated above, the number of pixels, n, in the X-direction of this image sensor 400 is equal to 8s; accordingly, the fact that the counter $j_1$ exhibits the value s implies that s blocks have been processed; which means the block processing by the procedures of Steps S608 to S618 is to be repeated until $j_1$ becomes equal to s.

When it is determined in Step S619 that the counter $j_1$ has attained the value of s, the procedure returns to Step S602 by way of Step S621→Step S622. Then, as shown in FIG. 11, the (s+1) block, the (s+2) block, the (s+3) block, the (s+4) block, etc. are sequentially processed by the procedures of Step S602 onward.

Thus, in accordance with this second embodiment, sense lines ($510_{-1}$, $510_{-2}$, $510_{-3}$, .... $510_{-n}$) are provided between the image sensor 400 and the shift register group $500_{-1}$ to $500_{-s}$, the number of these sense lines being the same as the number of pixels in one side of the image senor 400. Due to this arrangement, it is possible to read image data block by block from the image sensor 400 and directly execute signal processing on a block basis, thus eliminating the need for a buffer memory.

Further, unlike the prior-art examples, this embodiment allows the manner in which data is read to remain the same regardless of whether the row to be read is one where block processing is performed or one where it is not, thus simplifying the reading control.

[Modification]

The present invention is applicable to modifications or variations of the above first and second embodiments without departing from the spirit and scope thereof.

For example, while the first and second embodiments were described as applied to a case where compression is performed in blocks of 8×8 pixels each so as to present them in a simple and concrete form, the present invention is also applicable to a case where the block size is different. Further, the same effect can also be obtained where a block processing other than compression is performed.

While in the above first and second embodiments the image sensor and the controller were separated components, they may be realized in the form of an LSI encased in a single chip. In that case, it is only necessary for the controller in the LSI to be informed of the size of the block serving as the unit for image processing, as the data for the control program.

Further, in the first embodiment the subs-canning is executed in Step S218 when $j_1$=n in Step S213. However, in view of the fact that compression processing effected in Steps s215, S216, etc. takes time, the sub-scanning may be executed simultaneously with the processing of the loop of Steps S203 to S215, whereby a further improvement can be achieved in terms of processing efficiency.

Further, the present invention is applicable to modifications or variations of the above second embodiment without departing from the spirit and scope thereof.

For example, while, for the sake of concreteness, the second embodiment was presented as applied to a case where compression is performed in blocks of 8×8 pixels each, the same effect can be obtained under a different block size or in a signal processing other than compression.

The present invention is not limited to the above embodiments and various changes and modifications can be made within the spirit and scope of the present invention. Therefore, to apprise the public of the scope of the present invention the following claims are made.

What is claimed is:

1. An image data compressing apparatus comprising:

(a) image pickup means for producing an image signal corresponding to an s×s block of image data, said image pickup means having a plurality of sensor elements of r rows by s columns, wherein r and s are integers, r is a multiple of S, and s is greater than one, each sensor element storing an image datum, wherein said image pickup means includes read out means for reading out the s×s block of image data from s rows and s columns of said image pickup means to form the image signal;

(b) block coding means for block coding a plurality of the s×s blocks of image data, each s×s block of image data formed directly by said block coding means, without the need to buffer the data of each row or column of sensor elements, from the image signal produced by said image pickup means; and (c) control means for sequentially reading out a subsequent s×s block of image data by said read out means of said image pickup means in response to a completion of the block coding of each s×s block of image data by said block coding means.

2. An apparatus according to claim 1, further comprising an output amplifier means for amplifying said image signal formed by said read out means.

3. An apparatus according to claim 1, wherein said block coding means compresses the s×s block of image data by using a DCT method.

4. An apparatus according to claim 1, further comprising an analog to digital convertor for converting the analog image signal formed by said read out means into a digital image signal for input to said block coding means.

5. An image data compressing apparatus comprising:

(a) image pickup means for producing a plurality of image signals, each image signal corresponding to an 1×s block of image data, said image pickup means including a plurality of sensor elements arranged in rows and columns, each sensor element storing an image datum;

(b) a plurality of read out means, each read out means for simultaneously reading out the 1×s block of image data from each row and s columns of said image pickup means and forming each respective image signal, wherein s is an integer greater than one;

(c) s output amplifier means, each output amplifier means for amplifying the respective image signal formed by each said read out means; and (d) block coding means for block coding a plurality of s×s blocks of image data, each s×s block of image data formed directly from the 1×s blocks of image data of the respective image signals passed through said s output amplifier means, without the need to buffer the data of each row or column of sensor elements; and (e) control means for reading out a subsequent plurality of 1×s blocks of image data from said image pickup means through said read out means, to be formed into a subsequent s×s block of image data by said block coding means, in response to a completion of the block coding of each s×s block of image data by said block coding means.

6. An apparatus according to claim 5, further comprising s analog to digital convertors, each for converting the analog image signal amplified by each respective output amplifying means into a digital image signal for input to said block coding means.

7. An apparatus according to claim 5, wherein said block coding means compresses the s x s block of image data by using a DCT method.

8. An apparatus according to claim 5, further comprising sub-scanning means for sub-scanning said image pickup means in a predetermined direction.

* * * * *

UNITED STATES PATENT AND TRADEMARK OFFICE
CERTIFICATE OF CORRECTION

PATENT NO. : 5,754,705

DATED : May 19, 1998

INVENTOR(S): TADASHI OKINO

Page 1 of 2

It is certified that error appears in the above-identified patent and that said Letters Patent is hereby corrected as shown below:

ON COVER PAGE, AT [56] U.S. PATENT DOCUMENTS

"Freeman" should read --Freedman--.

COLUMN 1

Line 7, "continuation" should read --a continuation--.

COLUMN 5

Line 44, "direction)" should read --direction).--;
Line 45, "CCD")." should read --CCD:.)--.

COLUMN 7

Line 42, "of a" should read --of an--.

COLUMN 9

Line 15, "eighth" should read --data of the eighth--.

COLUMN 10

Line 12, "m/8" should be deleted.

UNITED STATES PATENT AND TRADEMARK OFFICE
CERTIFICATE OF CORRECTION

PATENT NO. : 5,754,705
DATED : May 19, 1998
INVENTOR(S): TADASHI OKINO

It is certified that error appears in the above-identified patent and that said Letters Patent is hereby corrected as shown below:

COLUMN 11

Line 55, "subs-canning" should read --sub-scanning;
Line 58, "s215," should read --S215,--.

COLUMN 12

Line 16, "S," should read --s,--.

Signed and Sealed this

Ninth Day of March, 1999

Attest:

Q. TODD DICKINSON

Attesting Officer

Acting Commissioner of Patents and Trademarks